United States Statutory Invention Registration [19]

[11] Reg. Number: H814

Sherrell [43] Published: Sep. 4, 1990

[54] COLLAPSABLE SEAL MEMBER

[75] Inventor: Dennis L. Sherrell, Kennewick, Wash.

[73] Assignee: The United States of America as represented by the United States Department of Energy, Washington, D.C.

[21] Appl. No.: 559,506

[22] Filed: Dec. 8, 1983

[51] Int. Cl.[5] ..... F16J 15/46

[52] U.S. Cl. ..... 277/34.3; 277/34

[58] Field of Search ..... 277/34.3, 34.6, 34; 220/232; 49/477; 285/97; 403/5

[56] References Cited

U.S. PATENT DOCUMENTS

| | | | |
|---|---|---|---|
| 1,474,270 | 11/1923 | Lewis . | |
| 1,535,219 | 4/1925 | Fulton . | |
| 1,674,038 | 6/1928 | Glass . | |
| 2,305,809 | 12/1942 | Maisch . | |
| 2,369,823 | 2/1945 | Freed . | |
| 3,042,980 | 7/1962 | Brinsmade | 49/477 |
| 3,169,540 | 2/1965 | Moore et al. | 220/232 X |
| 3,178,779 | 4/1965 | Clark et al. . | |
| 3,325,042 | 6/1967 | Brown | 220/232 |
| 3,347,200 | 10/1967 | Mege . | |
| 3,591,963 | 7/1971 | Kopp . | |
| 3,747,275 | 7/1973 | May et al. | 49/477 |
| 3,764,037 | 10/1973 | Rothrock . | |
| 3,773,338 | 11/1973 | Fidler et al. | 277/34.3 |
| 3,964,962 | 10/1972 | McDonald et al. . | |
| 4,129,307 | 12/1978 | Nishiura et al. . | |
| 4,269,419 | 5/1981 | Brant | 277/34.3 |

FOREIGN PATENT DOCUMENTS

| | | | |
|---|---|---|---|
| 2047356A | 11/1980 | United Kingdom | 277/34.3 |

*Primary Examiner*—Thomas H. Tarcza
*Assistant Examiner*—Linda J. Wallace
*Attorney, Agent, or Firm*—Edward V. Hiskes; Richard Southworth, III; William R. Moser

[57] ABSTRACT

A hollow, collapsable seal member normally disposed in a natural expanded state offering fail-safe pressure sealing against a seating surface and adapted to be evacuated by a vacuum force for collapsing the seal member to disengage the same from said seating surface.

2 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COLLAPSABLE SEAL MEMBER

The U.S. Government has rights in this invention pursuant to Contract No. DE-AC06-76FF02170 between the U.S. Department of Energy and the Westinghouse Electric Corporation.

BACKGROUND OF THE INVENTION

This invention relates generally to seals and, more particularly, to a collapsable, fail-safe seal member employed in pipe connections and the like.

A sealing problem is encountered in those sealing applications where the seal of one member and the opposite mating or seating surface of an opposed member must slide or move laterally relative to each other for accurate positioning. This is due to the interference or sliding friction between the seal and its seating surface causing the seal to become excessively worn or torn. Attempts have been made to solve this problem by employing inflatable seals i.e., hollow seals which are deflated in their normal static conditions to provide clearance between the seal and its seating surface for relative lateral movement therebetween and, when positioned in registry with each other, are inflated by a fluid pressure medium to provide pressure sealing against the associated seating surface. The fluid pressure is released when desired to break the seal in order to permit relative transverse movement between the latter and its seating surface. Sometimes upon pressure release, the seal does not always deflate nor disengage from its seating surface, thereby incurring undesirable sliding friction or interference upon transverse relative movement of the opposed parts. More importantly, leakage or loss of the pressure fluid medium during use results in the loss of the sealing function.

Still other sealing arrangements utilize redundancy whereby an inner inflatable seal is completely encapsulated in an outer inflatable seal so that a puncture or failure of the outer seal still leaves an inner seal capable of providing pressure sealing. Not only are these dual sealing arrangements expensive and difficult to fabricate, but they also employ a pressure fluid source which, upon failure, would abort their sealing functions.

Accordingly, a primary object of the present invention is to provide a new and useful fail-safe collapsable seal member.

Another object of this invention is to provide a new and useful hollow seal member providing pressure sealing in its normal expanded state and collapsable upon energization into a disabled state.

A further object of the present invention is to provide in the foregoing hollow seal member a bias member to impart additional radial forces for augmenting pressure sealing against an associated seating surface.

These and other objects, advantages, and characterizing features of the present invention will come clearly apparent from the ensuing detailed description of an illustrative embodiment thereof, taken together with the accompanying drawings wherein like reference characters denote like parts throughout the various views.

SUMMARY OF THE INVENTION

A collapsable seal member comprising a top wall, a bottom wall and a pair of side walls forming a tubular structure. The seal member affords pressure sealing in its normally expanded state to provide fail-safe sealing against a seating surface and is collapsable away from such seating surface by evacuating the interior of said tubular structure.

DETAILED DESCRIPTION OF THE PREFERRED EMBODIMENT

Figure 1:
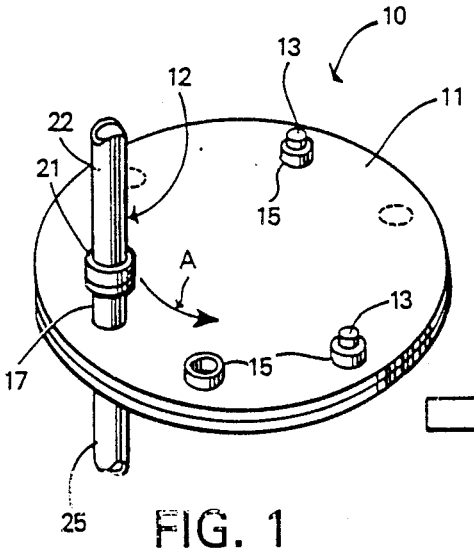
FIG. 1 is a perspective view of a specimen handling apparatus embodying the novel seal member of this invention.

Referring now in detail to the illustrative embodiment depicted in the accompanying drawing, there is shown in FIG. 1 a portion of a specimen handling system, comprehensively designated 10, comprising a turntable 11 operatively associated with a tubular transport system 12 embodying the novel features of this invention, as will hereinafter be more fully described. The turntable 11 is rotatable in the direction of arrow A about a vertical axis for indexing capsules 13 retained in cups 15 rigidly secured to the upper surface of turntable 11. The capsules 13 are indexed to various circumferentially spaced workstations located along the periphery of turntable 11.

The capsules 13 contain specimens, specifically nuclear fuel pellets, conveyed via tubular transport system 12 from a sampling station located at a remote fuel fabrication location (not shown) to the turntable 11 for the performance of certain handling operations. The turntable 11 is encapsulated in an air-tight enclosure commonly referred to as a "glove box" (not shown), and all operations therewithin are remotely controlled exteriorly of the glove box. Since these workstations and the functions thereof form no part of this invention, no further amplification or description thereof is believed necessary.

Figure 2:
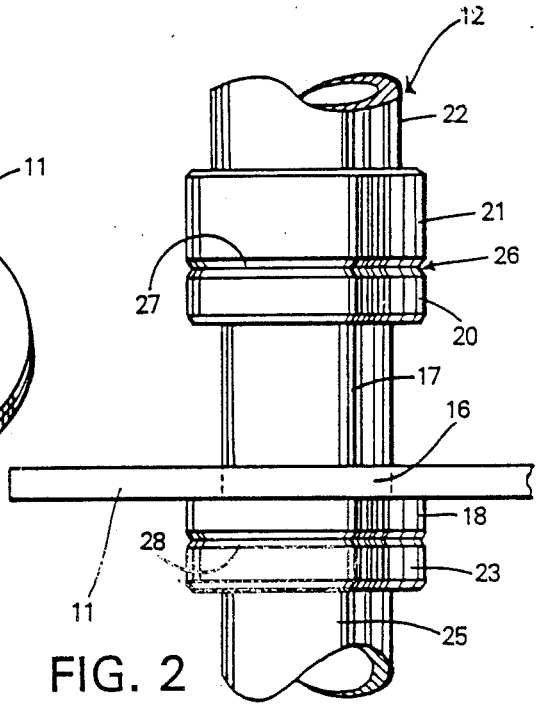
FIG. 2 is a fragmentary, front elevational view of a tubular transport system, showing the seal member of this invention in use in its expanded, fail-safe condition between opposed piping sections.

As best shown in FIG. 2, the turntable 11 is formed with an opening 16 therethrough and is provided with an upper tubular extension 17 and a lower tubular extension 18 coaxially aligned with opening 16. The upper and lower tubular extensions 17 and 18 are welded or otherwise fixedly secured to the upper and lower surfaces, respectively, of turntable 11 and are movable therewith. The extension 17 terminates in an enlarged formation 20 of increased diameter adapted to mate and register with the enlarged formation 21 of an upper pipe section 22 forming a part of the tubular transport system 12. Likewise, extension 18 is adapted to be aligned with an enlarged formation 23 on a lower pipe section 25, also forming a part of the tubular transport system 12. With these parts in registry, as shown in FIGS. 1 and 2, a capsule 13 is delivered to the turntable 11 in the following manner. The capsule 13 is conveyed through the tubular transport system 12 and, in the final stage of conveyance, is directed upwardly through the lower pipe section 25, lower extension 18, opening 16, upper extension 17 and into the upper pipe section 22 to a level above extension 17. The turntable 11 is then indexed in the direction of arrow A to move the extensions 17 and 18 out of the way and position a cup 15 beneath pipe section 22 in vertical alignment therewith. The suspended capsule 13 in pipe section 22 is then lowered and deposited into the cup 15 for subsequent operations upon being indexed along the several workstations. The extensions 17 and 18 are indexed along with the turntable 11 and ultimately positioned in registry with pipe sections 22 and 25 to receive another capsule 13 for repeating the above described cycle.

It should be appreciated that it is necessary to isolate the glove box atmosphere from the tubular transport system 12 during delivery of a capsule 13 because of the transient pressures therebetween. For example, if the system 12 were opened during blower operation, pressure decrease or buildup in the enclosed glove box atmosphere could exceed design limitations to force the flexible arm receptacles of the glove box inwardly or outwardly, detaching the same from the glove box to expose the entire facility and personnel to irradiation and contamination. Therefore, pressure sealing contact must be realized between the mating surfaces of the extensions 17, 18 and their associated pipe sections 22 and 25. To this end, an endless, annular seal member 26 is mounted on the lower annular end face of pipe enlargement 21 and on the upper annular end face of pipe enlargement 23 in pressure sealing engagement against the mating or seating surfaces 27 and 28 of extension enlargement 20 and extension 18. Alternatively, seal members 26 could be mounted on surfaces 27 and 28 of members 21 and 18, if desired.

A conventional seal would not suffice in the present application because of the interference between the leading edges of the seal and its seating surface when moving these elements laterally relative to each other. This interfering or nibbling action would cause damage to the seal, thereby shortening its useful life. While a conventional inflatable seal would work, a puncture or accidental loss of pressure would deflate the seal and thereby abort its sealing function. The seal member 26 constructed in accordance with this invention overcomes these shortcomings as will presently become apparent.

In accordance with this invention, seal member 26 preferably is formed of a resiliently yieldable elastomeric material having adequate properties of durability, compressibility, and expansion capabilities as well as being ozone and radiation resistant. However, seal member 26 can be formed of any suitable material, including metals, exhibiting similar properties. Seal member 26 is formed of a unitary, one-piece construction and can take various outside dimensions and planar configurations to conform to the surfaces with which it is used.

The hollow seal member 26 has a generally hour-glass configuration in cross section and comprises a pair of sidewalls 30 and 31 connected at their upper ends to a top wall 32 and at their lower ends to a bottom wall 33 which is substantially straight from end to end. The sidewalls 30 and 31 have upper inclined portions 35 and 36 which extend downwardly from top wall 32 in converging relation and are joined to lower inclined portions 37 and 38 extending upwardly from bottom wall 33 in a converging relation. This hour-glass configuration of sidewalls 30 and 31 will assure inward folding thereof within the interior of the seal member 26 upon collapse of the same as shown in FIG. 4.

The top wall 32 is formed with a series of laterally spaced ribs 40 adapted to engage the associated seating surface with an interference fit to provide pressure sealing therebetween. While four such ribs 40 are shown in the illustrated embodiment depicted in FIGS. 3 and 4, it should be understood that the seal member 26 of this invention can have more or less than four ribs, as desired. Also, the terms upper, lower, top, bottom, vertical, horizontal and the like, as used herein to describe seal member 26, are applied only for convenience of description with reference to FIGS. 3 and 4 of the drawings and should not be taken as limiting the scope of this invention. For example, when seal member 26 is attached to the lower end of pipe enlargement 21, the wall 32 along with the ribs 40 are oriented downwardly to provide pressure sealing with seating surface 27.

Figure 3:
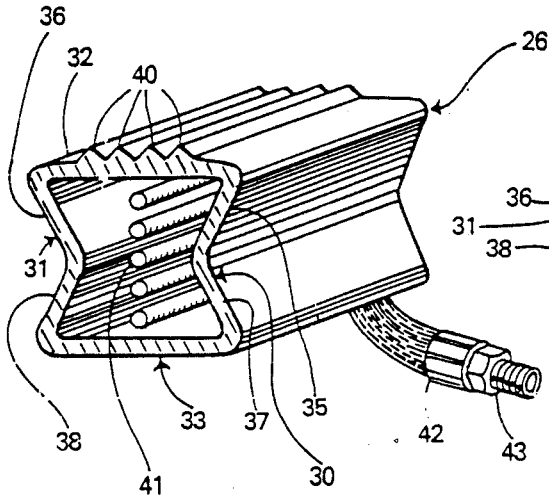
FIG. 3 is a perspective, transverse sectional view of the seal member constructed in accordance with this invention, broken away to indicate an indeterminate length, and shown in its normal expanded pressure sealing state.

FIG. 3 depicts seal member 26 in its normal, natural state i.e., in an expanded condition for effecting pressure sealing as shown in FIG. 2. The inherent durometer rating of the material of which seal member 26 is composed and the configuration of sidewalls 30 and 31 render it sufficiently rigid to exert adequate vertically directed forces acting against the associated seating surface. A puncture or opening in the walls of seal member 26 will not in any way affect its sealing function since it is not dependent on a fluid pressure medium as otherwise required for conventional inflatable seals. Thus, the seal member 26 is in a fail-safe condition in its natural expanded state. Additionally, a spring 41 can be provided, if desired, within the interior of seal member 26 to impose a greater radial force to augment pressure sealing. However, it should be noted that spring 41 is not necessary for seal member 26 to perform its sealing function.

Figure 4:
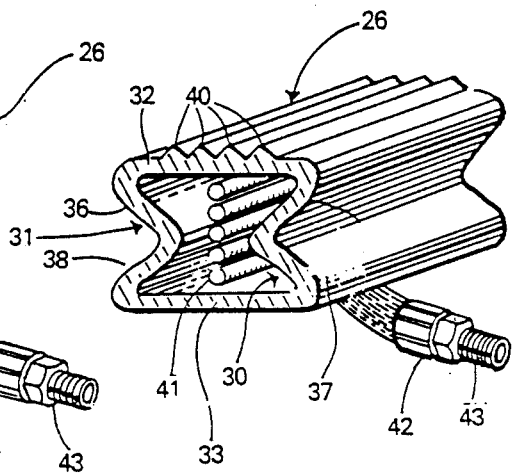
FIG. 4 is a view similar to FIG. 3, showing the seal member in a collapsed condition.

When it is desired to break the seal members 26, i.e., disengage the latter from their associated seating surfaces in order to provide the necessary clearance for moving extensions 17 and 18 relative to the seal member 26 without interference thereby, each of the seal members 26 is collapsable into a position such as shown in FIG. 4 for example. To this end, a stem assembly 42 is connected through the wall 33 of seal member 26 into the interior thereof and is provided with a male thread connector 43 for attachment to a suitable flexible hose (not shown) connected to a suitable source of vacuum (also not shown). Thus, when it is desired to break the seal, the interior of seal member 26 is evacuated by energizing the vacuum source to collapse the seal for disengaging the same from its mating or seating surface. The vacuum force overcomes the bias of spring 41 to permit such collapse and the specific shape of side walls 30 and 31 will assure inward folding thereof into the interior of the seal member 26 upon inward movement of the other two walls 32 and 33. This provides the necessary clearance, allowing the seal member 26 and associated seating surface to be moved laterally relative to each other.

From the foregoing, it is apparent that the objects of the present invention have been fully accomplished. As a result of this invention, a new and useful collapsable seal member is provided and adapted to be disposed in an extended or pressure sealing condition by virtue of its inherent natural expanded state and must be positively evacuated internally to collapse away from its associated seating surface. Thus, the seal member 26 remains in an expanded or pressure sealing condition even though punctured so as to effect a fail-safe sealing condition and cannot be collapsed unless positively energized by a vacuum force.

While seal member 26 is employed between axially spaced-apart members in the foregoing illustrative embodiment, it should be understood that the seal member of this invention can be interposed between annularly spaced members, such as concentric tubes for example, if desired.

It is to be understood that the form of the invention herein shown and described is to be taken as an illustrative embodiment only of the same, and that various changes in the shape, size, and dimensions thereof may be resorted to without departing from the spirit of the invention.

I claim:

1. A seal number for providing pressure sealing between relatively movable members comprising: an annular body of resiliently yieldable elastomeric material formed in a unitary, one-piece construction and having a mounting wall secured to one of said members, a sealing wall in spaced and parallel relation to said mounting wall and a pair of radially spaced inner and outer circumferential side walls, said mounting and sealing walls formed integral with said side walls to define a hollow tubular structure in cross-sectional configuration, said side walls bent inwardly to influence the folding thereof into said tubular structure upon collapse of said tubular structure, said side walls being sufficiently rigid in the normal static state of said body for exerting forces against said sealing wall to urge said sealing wall in leaktight pressure sealing engagement against a seating surface on said other member, a plurality of integral annular ribs on said sealing wall and coextensive therewith for providing an interference fit with said seating surface, and means for evacuating the interior of said tubular structure to collapse said structure and displace said sealing wall away from said other member seating surface before laterally displacing said movable members relative to each other.

2. A seal member according to claim 1, including means within said hollow tubular structure for biasing said sealing wall against said seating surface.

* * * * *